United States Patent
Kimberley

(10) Patent No.: US 6,998,449 B2
(45) Date of Patent: Feb. 14, 2006

(54) LATENT METALLOCENE CATALYST SYSTEMS FOR OLEFIN POLYMERIZATION

(75) Inventor: Brian S. Kimberley, Bouche du Rhone (FR)

(73) Assignee: BP Corporation North America, Chicago, IL (US)

( * ) Notice: Subject to any disclaimer, the term of this patent is extended or adjusted under 35 U.S.C. 154(b) by 28 days.

(21) Appl. No.: 10/242,476

(22) Filed: Sep. 12, 2002

(65) Prior Publication Data

US 2003/0054943 A1     Mar. 20, 2003

Related U.S. Application Data

(60) Provisional application No. 60/322,341, filed on Sep. 14, 2001.

(51) Int. Cl.
*C08F 2/38* (2006.01)

(52) U.S. Cl. .................. 526/82; 502/103; 502/117; 502/118; 502/123; 502/125; 502/126; 502/102; 526/83; 526/84

(58) Field of Classification Search ................ 502/102, 502/103, 117, 118, 123, 125, 126; 526/82, 526/83, 84
See application file for complete search history.

(56) References Cited

U.S. PATENT DOCUMENTS

| | | | |
|---|---|---|---|
| 5,474,961 A | 12/1995 | Schlund et al. | 502/103 |
| 5,599,761 A | 2/1997 | Turner | 502/152 |
| 5,648,310 A * | 7/1997 | Wasserman et al. | 502/120 |
| 5,962,607 A | 10/1999 | Yamamoto et al. | 526/88 |
| 6,127,495 A | 10/2000 | Rosch et al. | 526/82 |
| 6,365,779 B1 | 4/2002 | Devore et al. | 568/1 |
| 6,417,298 B1 | 7/2002 | Ford et al. | 526/89 |

FOREIGN PATENT DOCUMENTS

| | | |
|---|---|---|
| EP | 0188914 | 7/1986 |
| EP | 0630910 | 12/1994 |
| EP | 630910 A1 * | 12/1994 |
| EP | 0729983 | 9/1996 |
| EP | 0748823 | 12/1996 |

OTHER PUBLICATIONS

"Supported Metallocene Catalysts for Olefin Polymerization" by Gregory G. Hlatky, published 2002 (pp. 202-218).

* cited by examiner

*Primary Examiner*—William K. Cheung
(74) *Attorney, Agent, or Firm*—James R Henes; David P. Yusko

(57) ABSTRACT

A metallocene catalyst may be temporarily and reversibly passivated by contact with an effective amount of a passivating compound selected from the group of oxygen, oxygen-containing compounds, and nitrogen-containing compounds.

12 Claims, No Drawings

LATENT METALLOCENE CATALYST SYSTEMS FOR OLEFIN POLYMERIZATION

CROSS REFERENCE TO RELATED APPLICATIONS

This application claims the benefit of U.S. Provisional Application No. 60/322,341, filed Sep. 14, 2001, which is incorporated by reference herein.

BACKGROUND OF THE INVENTION

This invention is directed to metallocene catalyst systems for olefin polymerization. More particularly, the invention is directed to a method for temporarily and reversibly passivating metallocene catalysts to provide metallocene compositions useful as latent olefin polymerization catalysts.

The latent olefin polymerization catalysts of this invention, when activated, are particularly useful in the polymerization of alkenes including 1-olefins such as propylene in a gas-phase reactor The process technology for the manufacture of polypropylene (PP) has evolved with improvement in catalyst technology, from complex slurry processes using an inert hydrocarbon diluent, to simpler bulk processes using liquid propylene diluent, to even more simplified gas phase processes.

Gas phase reactor processes widely known and well described in the art include those based on continuously stirred tank reactor and fluid bed technologies. Examples of such reactor systems are described in U.S. Pat. Nos. 3,957,448; 3,965,083; 3,971,786; 3,970,611; 4,129,701; 4,101,289; 3,652,527; and 4,003,712, all incorporated herein by reference. Typical gas-phase olefin polymerization reactor systems comprise at least one reactor vessel to which olefin monomer and catalyst components can be added and which contain an agitated bed of forming polymer particles. Generally, catalyst components are added together or separately through one or more valve-controlled ports in the single or first reactor vessel. Olefin monomer may be provided to the reactor through a recycle gas system in which unreacted monomer removed as off-gas and fresh feed monomer are mixed and injected into the reactor vessel. Polymerization will be carried out under conditions that exclude oxygen, water, and other materials that act as catalyst poisons. Polymer molecular weights are controlled through use of additives such as hydrogen in a manner well known to persons of skill in the art.

The BP Amoco Gas Phase Process for the manufacture of impact copolymers may be generally characterized as being conducted using two horizontal, stirred-bed, gas phase reactors in series. The plug-flow reactors employ an interlock system separating the first stage homopolymer reactor from the second stage copolymer reactor. The process provides an inherently narrow residence time distribution coupled with optimized stirring, minimizing temperature variations and resulting in greater product consistency. The BP Amoco process is disclosed generally in "Polypropylene Handbook" pp. 297–298, Hanser Publications, N.Y. (1996), and is more fully described in U.S. Pat. No. 3,957,448 and in "Simplified Gas-Phase Polypropylene Process Technology" presented in Petrochemical Review March, 1993. The teachings of these publications and the patent are hereby incorporated in their entirety by reference.

Rubber-modified polypropylene resins are prepared commercially for the most part by post-blending separately produced homopolymer and copolymer resins in a compounding operation. In-reactor processes wherein homopolymer formed from the first monomer in a first reactor is subsequently reacted with the second monomer in a second reactor have also been disclosed and described in the art. Gas phase reactor processes such as are described in Hydrocarbon Processing 74 pp. 140–142 are disclosed to be useful for the production of impact PP resins. The two-stage horizontal gas phase reactor described in Polyolefins VI SPE RETEC, Houston, Tex. (1991), page 68 has also been employed in the production of impact polypropylene. Processes for use in the manufacture of copolyolefins have been further described in Petrochemical Review, March, 1993, in U.S. Pat. No. 3,957,448 and in Chemical Engineering Science Vol. 47, no. 9–11 (1992) pp. 2591–2596.

The polymerization catalysts conventionally employed in these processes have generally been Ziegler-Natta type catalysts. For example, the Amoco gas phase process is disclosed in the art to typically employ fourth generation supported catalysts consisting of three components: a proprietary solid supported catalyst, a trialkylaluminum activator or cocatalyst, and an external modifier or donor. Separately, the catalyst components are inactive. Hence the supported catalyst and activator may be suspended in propylene and fed to the reactor as separate streams without initiating polymer formation in the feed lines.

Recently there has been developed a practical catalyst technology based on metallocene compounds, termed sixth generation catalysts by E. Albizzati et al. in "Polypropylene Handbook". Metallocene catalysts, such as Group 4 metallocenes, typically are soluble organic complexes that result from the reaction of biscyclopentadienyl transition metal complexes (metallocenes) with a cocatalyst, generally an aluminum compound. Most metallocene catalysts employed for propylene polymerization are zirconium-based, and the most widely used cocatalyst is methylaluminoxane (MAO), derived from trimethylaluminum (TMA). Other metallocene catalyst systems disclosed in the art include combinations of metallocene dialkyls with boron compounds, further including trialkylaluminum compounds.

Supported metallocene-based catalyst systems, which may be more particularly described as fully active, metallocene-based catalyst systems immobilized on a particulate carrier having narrow size distribution such as a finely divided silica, alumina, $MgCl_2$, zeolite or the like, are also known. Solution and bulk processes for ethylene and propylene polymerization employing supported metallocene-based catalysts have been disclosed and are well described in the art.

Metallocene catalysts are difficult to employ directly in conventional polymerization processes, and particularly in gas phase processes where the catalyst system will be dispersed in a hydrocarbon or in monomer and metered into the reactor through feed lines. Supported metallocene catalysts are optimally active when preactivated, i.e. combined with the cocatalyst component prior to being introduced into the reactor. Dispersing such catalysts in the olefin monomer stream for direct feed to the reactor system results in polymer formation and causes severe plugging of the feedlines. Moreover, polymerization proceeds before the catalyst system is dispersed fully and uniformly through the polymer bed in the reactor, resulting in highly active hot spots that promote the formation of lumps and plating out. The reactor rapidly becomes fouled, reducing catalyst yields and requiring frequent shutdowns to clean the reactor.

Inert gases, hydrocarbons and the like have been employed as diluents and as carriers for use with Ziegler-Natta catalysts. These methods have had some success when employed with soluble metallocene catalysts in solution and bulk polymerization systems. In gas phase processes employing continuously stirred tank reactor and fluid bed technologies, the use of such diluents and carriers for feeding supported metallocene catalyst systems to the reactor with the olefin stream has generally not been successful. Although the problem of plugging may be avoided by dispersing the supported catalyst in an inert hydrocarbon such as propane and separately metering the mixture to the reactor, it is difficult to adequately disperse the catalyst through the reactor polymer bed rapidly enough to avoid forming lumps and strings.

Temporarily reducing the activity of metallocene catalysts has been described in the art. For example, adding a dialkyborane or dialkylaluminum to the reactor during a polymerization to temporarily retard the activity of metallocene catalysts has been disclosed as a method for process control. However, catalyst activity is only partially retarded by such treatment. Catalysts directly treated with a dialkyborane or dialkylaluminum retain sufficient activity to initiate polymerization when dispersed in the monomer feed stream. Moreover, the recovery period is very brief, too brief to allow the catalyst system to be adequately dispersed in a stirred reactor gas phase reactor bed before the catalyst recovers and polymerization proceeds.

It is known that metallocene catalysts are deactivated by Lewis acids. Reactivating a Lewis acid-treated catalyst after it is dispersed in the reactor bed requires adding excess MAO, which is difficult to disperse because of its low volatility. Separately adding an alkali metal alkyl or alkaline earth metal alkyl and a fully active, supported metallocene catalyst to a reactor before contacting with monomer has been disclosed to be useful for avoiding lumps and wall formations in the suspension polymerization of ethylene polymers and copolymers. The use of Lewis bases to retard or terminate a metallocene catalyzed polymerization as a means for process control is also disclosed in the art. Restarting the polymerization, accomplished by adding excess MAO, may require adding as much MAO as was employed in the initial preparation of the catalyst. Due to poor volatility, dispersing the MAO uniformly through the reactor bed is difficult, and the polymerization activity after restart may be substantially reduced. Moreover, many Lewis base compounds are irreversible catalyst poisons. In a continuous process such poisons will accumulate in the reactor over time, requiring that the process be stopped while the reactor is cleaned.

Thus, there does not appear to be available a method for temporarily and reversibly passivating metallocene catalysts whereby catalyst activity becomes reduced to a level that will allow feeding the catalyst to the reactor in contact with olefin monomer and adequately dispersing the catalyst in the reactor polymer bed prior to reactivating.

SUMMARY OF THE INVENTION

This invention is directed to a method for temporarily and reversibly passivating metallocene catalysts wherein fully active metallocene catalysts may be temporarily and reversibly passivated by contacting with an effective amount of a passivating compound.

The temporarily and reversibly passivated metallocene catalysts of this invention, further characterized as latent olefin polymerization catalysts, will have substantially reduced activity for polymerization of olefins. The latent catalyst thus may be dispersed in an olefin monomer such as propylene, fed to the reactor and dispersed through the reactor polymer bed without polymerizing the monomer to a significant extent. Preferably, the latent catalyst will remain inactive as a polymerization catalyst for olefins under the intended operating conditions until suitably reactivated, for example, by being contacted with an effective amount of an activator in a subsequent reaction step.

The invention may be still further described and characterized as directed to a gas-phase polymerization process for the polymerization of olefins comprising reversibly passivating a conventional metallocene catalyst to provide a latent catalyst, feeding the latent catalyst to the reactor optionally in contact with monomer, then reactivating the catalyst and carrying out the polymerization.

DESCRIPTION OF THE PREFERRED EMBODIMENT(S)

The metallocene catalyst systems useful in the practice of this invention, also referred to in the art as metallocene catalysts and as metallocene catalyst complexes, comprise metallocenes selected from Groups 4 and 5 (IUPAC nomenclature) metallocenes and a suitable cocatalyst, preferably an aluminoxane cocatalyst such as methyl aluminoxane (MAO).

A great variety of metallocenes suitable for use in forming metallocene catalyst systems have been described in the art, including complexes of titanium, zirconium, hafnium, vanadium, niobium and tantalum. Illustrative of such complexes are:

dimethylsilyl-bis-(2-methyl-4;5-benzo[e]indenyl) zirconium dichloride; dimethylsilanediyl-bis-(3-tert-butyl-5-methylcyclopentadienyl) zirconium dichloride; diethylsilanediyl-bis-(3-tert-butyl-5-methylcyclopentadienyl) zirconium dichloride; methylethylsilanediyl-bis-(3-tert-butyl-5-methylcyclopentadienyl) zirconium dichloride; dimethylsilanediyl-bis-(3-tert-butyl-5-ethylcyclopentadienyl) zirconium dichloride; dimethylsilanediyl-bis-(3-tert-butyl-5-methylcyclopentadienyl)-dimethyl zirconium; dimethylsilanediyl-bis-(2-methylindenyl) zirconium dichloride; diethylsilanediyl-bis-(2-methylindenyl) zirconium dichloride; dimethylsilanediyl-bis-(2-ethylindenyl) zirconium dichloride; dimethylsilanediyl-bis-(2-isopropylindenyl) zirconium dichloride; dimethylsilanediyl-bis-(2-tert-butylindenyl)-zirconium dichloride; diethylsilanediyl-bis-(2-methylindenyl) zirconium dibromide; dimethylsulfide-bis-(2-methylindenyl) zirconium dichloride; dimethylsilanediyl-bis-(2-methyl-5-methylcyclopentadienyl) zirconium dichloride; dimethylsilanediyl-bis-(2-methyl-5-ethylcyclopentadienyl) zirconium dichloride; dimethylsilanediyl-bis-(2-ethyl-5-isopropylcyclopentadienyl) zirconium dichloride; dimethylsilanediyl-bis-(2-methylindenyl) zirconium dichloride; dimethylsilanediyl-bis-(2-methylbenzindenyl) zirconium dichloride; dimethylsilanediyl-bis-(2-methylindenyl) hafnium dichloride; dimethylsilyl-bis(2-methyl-4-phenylindenyl) zirconium dichloride; dimethylsilyl-bis(2-ethyl-4-phenylindenyl) zirconium dichloride; dimethylsilyl-bis(2-methyl-4-naphthylindenyl) zirconium dichloride; dimethylsilyl-bis-(2-ethyl-4-phenylindenyl) zirconium dichloride; dimethylsilyl-bis-(2-methyl-4-isopropylindenyl) zirconium dichloride; dimethylsilyl-bis-(2-ethyl-4-isopropylindenyl) zirconium dichloride; and isopropylidene(3-tert-butyl-cyclopentadienyl)(fluorenyl) zirconium dichloride.

Zirconium-based metallocenes have been found particularly useful in providing catalyst systems useful in the polymerization of propylene.

Metallocene catalyst systems further contain a cocatalyst. Particularly suitable are aluminoxane compounds, more particularly described as poly(hydrocarbyl aluminum oxide). Aluminoxanes are well known in the art and may be formed by reacting water with an alkylaluminum compound. Generally, in the preparation of aluminoxanes from, for example, trimethylaluminum and water, a mixture of linear and cyclic compounds is obtained.

The aluminoxanes may be prepared in a variety of ways. For example, an aluminum alkyl may be treated with water in the form of a moist solvent. Alternatively, an aluminum alkyl, for example trimethylaluminum, may be contacted with a hydrated salt such as hydrated ferrous sulfate, for example by treating a dilute solution of trimethylaluminum in toluene with a suspension of ferrous sulfate heptahydrate. It is also possible to form methylaluminoxanes by the reaction of a tetraalkyldialuminoxane containing C2 or higher alkyl groups with trimethylaluminum using an amount of trimethylaluminum which is less than a stoichiometric excess. The synthesis of methylaluminoxanes may also be achieved by the reaction of a trialkylaluminum compound or a tetraalkyldialuminoxane containing C2 or higher alkyl groups with water to form a polyalkylaluminoxane which is then reacted with trimethylaluminum. The synthesis of methylaluminoxanes, also known as modified aluminoxanes, by the reaction of a polyalkylaluminoxane containing C2 or higher alkyl groups with trimethylaluminum and then with water is disclosed in the art, for example, in U.S. Pat. No. 5,041,584. Suitable aluminoxanes may be obtained from commercial sources including Albemarle Corporation and Akzo-Nobel.

Suitable methods for combining the metallocene and cocatalyst to form the metallocene catalyst systems employed in the practice of this invention are well known and widely described in the art. The amount of aluminoxane and metallocene usefully employed in preparation of the catalytically active material can vary over a wide range. The mole ratio of aluminum atoms contained in the aluminoxane to metal atoms contained in the metallocene is generally in the range of from about 2:1 to about 100,000:1, preferably in the range of from about 10:1 to about 10,000:1, and more preferably in the range of from about 50:1 to about 2,000:1.

The reaction products of the metallocene and aluminoxane are generally solid materials that can be recovered by any well known technique. For example, when produced in aliphatic solvents the solid material separates and can be recovered from the liquid by vacuum filtration or decantation; when produced in aromatic solvents the reaction products may be precipitated with a miscible non-solvent and then collected, or isolated by evaporating the solvent. The recovered catalytically active solid material may thereafter be dried under a stream of pure dry nitrogen or other inert gas, under vacuum, or by any other convenient manner.

The metallocene catalyst system may be employed directly for polymerization of olefins as a soluble catalyst, or may be supported on a suitable carrier such as, for example, finely divided silica, alumina, $MgCl_2$, zeolite, layered clays, mesoporous molecular sieves or the like. Particulate polymeric substrates such as a finely divided polyolefin have also been employed for this purpose. The particulate carriers preferably will have a particle diameter in the range of from 1 to 300 microns, and more preferably from 20 to 70 microns. Carriers may be used directly or pretreated with MAO before depositing the metallocene component, and MAO/silica substrates have been disclosed in the art for use in providing metallocene propylene polymerization catalyst systems. Preparative methods for producing fully active, supported metallocene catalyst systems useful in the practice of this invention are described and disclosed in the art, including in EP 567,952 and EP 578,838, and in EP 810,233. A variety of substrates suitable for use in the practice of the invention including MAO/silica substrates are available from commercial sources such as, for example, Witco Corporation. Particularly useful silica substrates are available from Grace-Davison, PQ Corporation, Crosfield Chemicals, and Degussa Corporation.

Generally, the supported catalyst may be prepared by depositing the metallocene component on an MAO/silica substrate from a slurry, then drying. In an alternative preferred procedure for the preparation of a supported catalyst system, the metallocene complex is applied to a suitable carrier, for example a dried silica slurried in an appropriate solvent such as, for example, toluene, then treated with MAO or other aluminoxane compound and metallocene complex. The mixture together with the slurried substrate may then be precipitated using a miscible nonsolvent such as dodecane, thereby depositing the catalyst components on the carrier. The catalyst will then be filtered and dried. Alternatively, the mixture may be evaporated to dryness.

The molar ratio of Al from the aluminoxane compound to Zr or other metal from the metallocene complex is from 50:1 to 2000:1, preferably from 100:1 to 1000:1, more preferably from 200:1 to 600:1. The amount of impregnating solution is chosen so that the carrier impregnated with the solution of metallocene complex and aluminoxane compound contains from 5 to 50 micro-mol of metallocene per gram after drying.

The active metallocene catalyst will be temporarily and reversibly passivated for use in the practice of this invention by contacting with an effective amount of a passivating compound to provide a latent metallocene catalyst. Compounds suitable for use as passivating compounds in the practice of this invention may be generally described as selected from molecular oxygen ($O_2$), oxygen-containing compounds, typically containing 2 to 20, preferably 3 to 12, carbon atoms, including metal (typically Group 2–13 metals, preferably aluminum) alkoxides such as aluminum trimethoxide, aluminum triethoxide and the like, ethers and cyclic ethers including dimethyl ether, diethyl ether, tetrahydrofuran and the like; ketones and aldehydes are not preferred. Useful nitrogen-containing compounds include alkylamines and cycloalkylamines, typically containing 2 to 20, preferably 3 to 12, carbon atoms, such as trimethylamine, tetramethylethylene diamine, N-methylpyrolidine, N-methylpiperidine and the like, and metal amides such as alkali metal dialkylamides such as lithium dimethylamide and the like, as well as those derived from dialkylamines and trialkylaluminum compounds. Di- and tri-alkyl amines are preferred and trialkylamines are especially preferred. Also similar compounds containing both oxygen and nitrogen, such as morpholine, may be used.

The metallocene catalyst may be contacted with the passivator in any convenient manner, for example, by suspending the catalyst in a suitable liquid medium containing an amount of passivator effective to reduce the activity of the metallocene catalyst below about 50% of the activity of the metallocene catalyst system prior to being passivated. Generally, from about 1 to about 5 equivalents of passivator per equivalent of metal in the catalyst complex will be found to be effective. However, the amount of passivator needed will depend in part on the passivator and on the metallocene catalyst components. For example, where oxygen is employed to passivate a supported zirconium metallocene catalyst system an amount of oxygen greater than about 1 equivalent per equivalent of metal may prevent the catalyst from becoming reactivated. Hence, use of passivator in excess of the amount required to provide the desired level of activity will be avoided. The activity of passivated metallocene catalysts obtained according to the method of this invention may be determined by measuring catalyst yield in an olefin polymerization process. A convenient method for such determininations employing a low pressure suspension polymerization process is described herein below.

The temperature used in conducting the passivation will not be particularly critical, and the process thus may be conducted at any convenient temperature for a period of time sufficient to ensure complete reaction. Generally, temperatures at or below room temperature will suffice, although the passivation will proceed to completion more rapidly when conducted at an elevated temperature, as great as 50 to 100° C. or greater, and preferably at a temperature below the volatilization temperatures of the passivator and medium selected. The passivated or latent metallocene catalyst may then be collected by filtration and dried, or used directly without being isolated.

The latent metallocene catalyst can be fed to the reactor in contact with monomer without initiating polymerization to plug the feedlines and foul the reactor. After being dispersed in the reactor, the catalyst will be reactivated and combined with olefin monomer to carry out the polymerization. Ideally, latent catalyst placed in contact with olefin monomer will become thermally reactivated upon reaching polymerization temperature or shortly thereafter, and will not require an added activator component. However, depending on the particular combination of passivator and catalyst, thermal reactivation may not occur, or may occur very slowly under such conditions. Acceptable levels of catalyst activity may be achieved within a useful and practical time period by adding an activator, generally described as an alkylating agent. Metal alkyls including trialkylaluminum compounds such as trimethylaluminum may be found suitable for this use.

The rate at which the catalyst becomes reactivated in the presence of an alkylating agent will be influenced by several factors including monomer concentration and reaction temperature. Generally the initial monomer insertion will proceed slowly, providing an induction period during which the catalyst may be dispersed adequately through the reactor, thereby reducing or eliminating polymerization hot spots and avoiding the production of lumps and reactor fouling.

The amount of activator employed will depend in part upon the particular compound employed in passivating the metallocene catalyst and on the specific activator selected. The amount of activator will be selected to be an amount effective to provide an active polymerization catalyst for the monomers under the polymerization conditions employed in the process. Generally, the amount of activator that will be effective in this regard will lie in the range of from about 0.1 to about 100 equivalents, preferably from about 0.1 to about 10 equivalents per equivalent of metal from the metallocene complex contained in the latent catalyst.

The latent catalyst compositions of this invention are useful in the polymerization of olefins, preferably alpha-olefins, to form polyolefins using any of the variety of polymerization processes known in the art for the production of polyolefins including in suspension, in solution in an inert liquid hydrocarbon, in bulk i.e. liquid monomer, and in stirred or fluidized bed gas phase polymerization processes and the like. As used herein, a "polyolefin" is meant to include homopolymers, copolymers, and terpolymers of such olefins and may optionally contain dienes, aromatic compounds with vinyl unsaturation and/or carbon monoxide.

Generally, olefin monomers suitable for these purposes will have from 2 to 14 carbon atoms and typically include, but are not limited to, ethylene, propylene, 1-butene, 1-pentene, 4-methyl-1-pentene, 1-hexene, styrene, substituted styrene and the like. Dienes that may optionally be polymerized with the olefins are those which are non-conjugated, and may be straight chain, branched chain or cyclic hydrocarbon dienes having from about 5 to about 15 carbon atoms. Examples of suitable straight chain, non-conjugated acyclic dienes include 1,4-hexadiene, 1,5-hexadiene, 1,7-octadiene, 1,9-decadiene and 1,6-octadiene; branched chain acyclic dienes such as 5-methyl-1,4-hexadiene, 3,7-dimethyl-1,6-octadiene, 3,7-dimethyl-1,7-octadiene and mixed isomers of dihydromyricene and dihydrocinene. Single ring alicyclic dienes such as 1,3-cyclopentadiene, 1,4-cyclohexadiene, 1,5-cyclooctadiene and 1,5-cyclododecadiene and multi-ring alicyclic fused and bridged ring dienes such as tetrahydroindene, methyl tetrahydroindene, dicyclopentadiene, bicyclo-(2,2,1)-hepta-2,5-diene, alkenyl, alkylidene, cycloalkenyl and cycloalkylidene norbornenes such as 5-methylene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene may also be found suitable.

Irrespective of the polymerization process employed, polymerization or copolymerization should be carried out at temperatures sufficiently high to ensure reasonable polymerization rates and avoid unduly long reactor residence times. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Olefin polymerization or copolymerization according to this invention may be carried out at monomer pressures of about atmospheric or above. Generally, monomer pressures range from about 20 to about 600 psi, although in vapor phase polymerizations the monomer pressures should not be below the vapor pressure at the polymerization temperature of the olefin to be polymerized or copolymerized.

The polymerization time will typically range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Inert hydrocarbon diluents suitable for use in slurry polymerization processes include alkanes and cycloalkanes such as pentane, hexane, heptane, n-octane, isooctane, cyclohexane, and methylcyclohexane; aromatics and alkylaromatics such as benzene, toluene, xylene, ethylbenzene, ethyl toluene and the like. It is often desirable to purify the polymerization medium prior to use, such as by distillation, percolation through molecular sieves, contacting with a scavenger compound such as an alkylaluminum compound capable of removing trace impurities, or by other suitable means.

Typical gas phase olefin polymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer is typically provided to the reactor through a recycle gas system in which unreacted monomer removed as off-gas and fresh feed monomer are mixed and injected into the reactor vessel.

Irrespective of the particular process employed, polymerizations with the metallocene catalyst systems that have been passivated and then reactivated according to the invention will be carried out under conditions that exclude oxygen, water, and other materials that may act as catalyst poisons. Additives to control polymer or copolymer molecular weight such as, for example, hydrogen, may be employed in a manner well known to persons of skill in the art. Although not usually required, those skilled in the polymerization process art will understand that a suitable catalyst deactivator may be added upon completion to terminate polymerization.

Products produced in accordance with the process of this invention are normally solid polyolefins. Homopolymer or copolymer yields are sufficiently high relative to the amount of catalyst employed so that useful products can be obtained without separation of catalyst residues. The polymeric products produced in the presence of the invented catalyst may be fabricated into a variety of useful articles including moldings, fiber and film by extrusion, injection molding, and other methods well known in the art and commonly employed for compounding and fabricating such plastics.

The invention will be better understood by way of consideration of the following illustrative examples and comparison examples, which are provided by way of illustration and not in limitation thereof. In the examples, all parts and percentages are by weight unless otherwise specified.

EXAMPLES

Catalyst Preparations

Supported metallocene catalyst employed in the following examples was prepared by slurrying dimethylsilylbis(2-methyl-4,5-benzo[e]indenyl) zirconium dichloride, obtained from Boulder Scientific Corporation as BSC 366, and methylaluminoxane in toluene with MAO-treated silica gel, substantially according to the procedure of example 2 of published European patent application EP 810,233.

Generally, catalyst preparation, storage and transfer operations will be conducted using carefully dried reagents and vessels, and in a dry box containing an inert gas atmosphere, for example, dry nitrogen or argon.

Oxygen-passivated catalyst having an oxygen-to-zirconium equivalents ratio=1 was prepared by adding 3.43 ml of oxygen (10% in nitrogen) to 0.5 g of the fully activated supported metallocene catalyst contained in an evacuated tube using a gas-tight syringe under dry conditions. The tube containing the catalyst and gas was agitated at room temperature for 30 min. then stored in a drybox for subsequent use.

A second preparation using 17.34 ml of oxygen provided an oxygen-passivated catalyst having an oxygen-to-zirconium equivalents ratio of 5.

Dimethylamine/triethylaluminum-passivated catalyst was prepared by placing 9.8 ml of hexane, 0.1 ml of triethylaluminum and 0.1 ml of diethyleamine in a dried vial and agitating the mixture for 60 min. at room temperature. Fully activated supported metallocene catalyst (0.35 g) was placed in a dry tube, together with 10 ml of dry hexane to form a suspension. A 0.166 ml aliquot of the dimethylamine/triethylaluminum solution was added to the tube, and the suspension further agitated for 45 min. at room temperature. The supernatant solution was then decanted and the remaining volatile components removed en vacuo to provide the passivated supported catalyst as a free-flowing powder. The catalyst was stored in a sealed tube in a drybox.

Aluminum triethoxide-passivated catalyst was prepared by placing 0.35 g of fully activated metallocene catalyst and 3.3 mg of aluminum triethoxide into a tube, adding 5 ml of dry hexane and agitating the resulting suspension for 3 hr. The supernatant solution was then decanted and the remaining volatile components removed en vacuo to provide the passivated supported catalyst as a free-flowing powder. The catalyst was stored in a sealed tube in a drybox.

Passivated catalysts were also prepared using triphenylboron and triphenylphosphine oxide as passivators. These were prepared substantially according to the process described for preparing aluminum triethoxide-passivated catalysts.

Screening Tests

Small scale, low pressure slurry polymerizations were carried out as screening tests to demonstrate the effectiveness of an olefin as a passivating agent for metallocene catalysts. The screening tests were carried out in 250 ml pressure bottle reactors fitted with a magnetic stirring bar and a gas inlet. The bottles were dried and purged with nitrogen, placed in a drybox, and treated with 1.0 ml of a hexane solution of tri-isobutylaluminum (60 mg/ml) as a scavenger. The reactors were then charged with molecular sieve-dried hexane and catalyst. The bottles were sealed, removed from the drybox, placed in a heating bath preheated to the selected reaction temperature, positioned over the magnetic stirrer, and connected to a dried, nitrogen-purged manifold through the gas inlet. The system was purged and filled with propylene. If used, hydrogen was then added to the bottles to a predetermined pressure. With stirring initiated, propylene was then admitted continuously to maintain an operating pressure of approximately 80 psi. After a reaction period of 30 minutes, propylene flow was stopped, and excess propylene pressure was vented. The bottles were removed from the manifold, and the polymer was collected by filtration and dried.

In the following Examples 1–4, each example represents a run comprising a total of six bottle reactors, 3 with passivated catalyst and 3 with the matching control catalyst. Reaction temperatures were selected to emulate the conditions encountered in a gas phase propylene polymerization reactor—50° C. for feedlines and 70° C. for the reactor bed. The 70° reactors were further charged with trimethylaluminum (TMA) to serve as an activator. Comparison runs C1–C2 were similarly carried out to provide comparisons with compounds ineffective as passivators and with compounds that passivate irreversibly under these conditions.

Reaction parameters, passivators and amount of passivator employed in each run, together with results averaged for successfully completed runs, are summarized in the following Table I.

TABLE I

| Ex. no. | Passivator | Equiv Ratio Passiv./Zr | Cat. Activity, 50° C. [1]g/g/hr | [2]% | Cat. Activity, 70° C. [1]g/g/hr | [2]% |
|---|---|---|---|---|---|---|
| 1 | Oxygen | 1 | 150 | 18 | 980 | 90 |
| 2 | Oxygen | 5 | 150 | 18 | 225 | 20 |

TABLE I-continued

| Ex. no. | Passivator | Equiv Ratio Passiv./Zr | Cat. Activity, 50° C. | | Cat. Activity, 70° C. | |
|---|---|---|---|---|---|---|
| | | | [1]g/g/hr | [2]% | [1]g/g/hr | [2]% |
| 3 | Oxygen | 1 | 137 | 15 | 1131 | 112 |
| 4 | DiMeAmine-TEA | 1.2 | 125 | 16 | 585 | 54 |
| 5 | DiMeAmine-TEA | . | 100 | 11 | 616 | 61 |
| 6 | Al triethoxide | 2 | <30 | <5 | 730 | 66 |
| 7 | Al triethoxide | | 26 | 2 | 887 | 88 |
| C1 | BPh$_3$ | 2 | 400 | 48 | 320 | 29 |
| C2 | OPPh$_3$ | 2 | 245 | 30 | 215 | 19 |

Notes: Equiv Ratio Passiv./Zr = ratio of equivalents of passivator to Zr equivalents; Cat(alyst) Activity: [1]g/g/hr = amount of PP produced by passivated catalyst (averaged); [2]% = ratio of passivated activity/control activity (×100).

It will be seen from a consideration of the examples presented in Table I that catalysts passivated with oxygen are substantially reduced in activity, producing little polymer under the feedline temperature condition, 50° C.; see Examples 1–3. When treated with TMA as an activator at 70° C., the catalyst passivated with an excess of oxygen was not reactivated; see Example 3. Metallocene passivated with a single equivalent of oxygen, Example 1 reached 90% of the initial catalyst activity when reactivated with TMA.

It will be seen from a consideration of the examples presented in Table I that catalysts passivated with oxygen are substantially reduced in activity, producing little polymer under the feedline temperature condition, 50° C.; see Examples 1–3. When treated with TMA as an activator at 70° C., the catalyst passivated with an excess of oxygen was not reactivated; see Example 2. Metallocene passivated with a single equivalent of oxygen, Examples 1 and 3, reached 90% of the initial catalyst activity when reactivated with TMA.

Catalysts were effectively passivated for use at 50° C. using aluminum triethoxide, Examples 6 and 7, and with dimethylamine -TEA, Examples 4 and 5 Passivation using these agents will be seen to be reversed by contacting with TMA at 70° C.

It will be seen that catalysts are not adequately passivated for use in contact with propylene at 50° C. when treated with boranes such as triphenyl borane, or with triphenyl phosphine oxide, and the level of activity remains unacceptably low when treated with TMA at 70° C.; see Examples C-1 and C-2.

The use of alkyl and aryl boranes for reversibly retarding metallocene-catalyzed bulk and solution polymerizations of ethylene is disclosed in the art. As observed above in conducting slurry polymerizations of propylene with supported metallocene catalyst systems, triphenylboron acts as a mild catalyst poison, the catalyst failing to become reactivated when treated with TMA and heated to 70° C. in contact with monomer.

In the following Comparison Examples C-3 to C-8, supported metallocene catalyst systems were treated with a variety of borane compounds and with an alkylaluminum hydride at a passivator:zirconium ratio of 5:1, substantially following the slurry process described for preparing aluminum ethoxide-passivated supported catalysts. The treated catalysts were evaluated in small scale, low pressure polypropylene slurry polymerizations substantially as outlined above.

The boron compounds evaluated in these runs and the abbreviated designators include:

9-BBN=9-borabicyclo[3.3.1]nonane
A-pinylBH2=alpha-pinylborane
PinacolBH=pinacolborane
t-hexylBH2=t-hexylborane or 1,1,2-trimethylpropylborane Catalyst treated with an aluminum compound, diisobutylaluminumhydride (Di-isobutylAIH), was also evaluated.

Reaction parameters, passivators and results averaged for successfully completed runs, are summarized in the following Table II.

TABLE II

| Ex. no. | Passivator | Temp ° C. | Time min. | [1]Control g/g/hr | Passiv. Cat. Activity | |
|---|---|---|---|---|---|---|
| | | | | | [2]g/g/hr | [3]% |
| C3 | 9-BBN | 50 | 10 | 74.4 | 67.3 | 90 |
| C4 | PinacolBH | 50 | 10 | 216.7 | 182.4 | 84 |
| C5 | t-hexylBH2 | 50 | 10 | 116.3 | 62.5 | 54 |
| C6 | A-pinylBH2 | 50 | 10 | 240.8 | 40.5 | 17 |
| C7 | A-pinylBH2 | 70 | 60 | 98.9 | 57.2 | 58 |
| C8 | Di-isobutylAIH | 50 | 10 | 91.6 | 105.0 | 115 |

Notes: For passivators, see text. [1]Control g/g/hr = amount of PP produced by control catalyst (averaged); Passiv. Cat. Activity: [2]g/g/hr = amount of PP produced by passivated catalyst (averaged); [3]% = (passivated/control) × 100.

It will again be apparent from the data presented in Table 2 that alkyl and aryl boron compounds are generally ineffective as passivating compounds for supported metallocene catalyst systems. The level of passivation in most instances is not sufficient to prevent significant polymerization from occurring when placed in contact with propylene at the temperatures encountered in reactor feedlines, and would likely cause plugging of feedlines. See Examples C-3 to C-5. The degree that supported metallocene catalyst was passivated by being treated with alpha-pinylborane will be seen to be marginally acceptable at 50° C. However, when maintained at 70° C. in the presence of TMA activator for as much as an hour the catalyst activity is not increased to an acceptable level. See Examples C-6 and C-7. Dialkylaluminum hydride-treatment of catalysts appears not to result in significant passivation, if any. See example C8.

Gas Phase Polymerizations

The activity of passivated catalysts, and particularly the ability of the catalyst to remain passivated in a reactor bed for a period of time sufficient to allow the catalyst to be adequately dispersed in the catalyst bed may be assessed by conducting further propylene polymerizations using a laboratory gas-phase reactor.

Propylene polymerizations for these evaluations may be performed in a one-gallon (3.8-liter) continuous, horizontal, cylindrical gas-phase reactor measuring 10 cm in diameter and 30 cm in length based on that described in U.S. Pat. No. 3,965,083. The reactor will be equipped with an on-gas port for recycling reactor gas through a condenser and back through a recycle line to the recycle nozzles in the reactor. Propylene liquid is used as the quench liquid to help remove the heat generated in the reactor during the polymerization. During operation, polypropylene powder produced in the reactor bed, passes over a weir, and is discharged through a powder discharge system into a secondary closed vessel blanketed with nitrogen. The polymer bed is agitated by paddles attached to a longitudinal shaft within the reactor that is rotated at about 50 rpm.

Generally, the passivated catalysts will be observed to remain passivated after entering the reactor long enough to allow the catalyst to become dispersed within the polymer bed, thereby avoiding polymerization hotspots. Runs carried out using fully active metallocene catalyst cause the formation of large lumps, which fouled the reactor bed and interfered with stirring, necessitating shutting down the reactor for cleaning after brief run times.

Catalyst yields observed in the gas phase polymerizations after reactivation will be increased, ranging from approximately half the yields observed when using a fully active supported catalyst to as great as that observed with untreated catalyst and greater.

The invention will thus be seen to be directed to a method for passivating fully active supported metallocene catalysts comprising a metallocene selected from Groups 4 and 5 metallocenes and an aluminoxane cocatalyst, the invented method comprising contacting the metallocene catalyst with an amount effective to reduce the activity of the metallocene catalyst below about 50% of the activity of the metallocene catalyst system prior to being passivated, preferably from about 1 to about 5 equivalents per equivalent of metal in the catalyst complex, of oxygen or an oxygen- or nitrogen-containing compound selected from the group consisting of elemental oxygen, metal alkoxides, ethers and cyclic ethers, alkylamines and cycloalkylamines and metal amides.

The activity of the passivated metallocene catalysts obtained according to the method of this invention, as determined by catalyst yield in an olefin polymerization, will be less than about 50%, preferably less than about 30%, more preferably less than about 15%, still more preferably from 0 to about 10% of the activity of the metallocene catalyst prior to being passivated. Catalyst activities for the comparison may be determined using any of a variety of polymerization processes and conditions. Data for the comparisons may be conveniently obtained using a catalyzed low pressure suspension polymerization process carried out with propylene monomer at 50° C. in the absence of an activator, substantially as outlined herein above. Those skilled in the art will recognize that the process conditions may be modified to accommodate other olefin monomers.

Passivated metallocene catalysts produced according to the invention may be further described and characterized as latent olefin polymerization catalysts comprising a Groups 4 and 5 metallocene, an aluminoxane and oxygen or an oxygen-containing compound or nitrogen-containing compound selected from the group consisting of metal alkoxides, ethers and cyclic ethers, alkylamines and cycloalkylamines and metal amides.

The passivation is temporary or reversible. The invented latent olefin polymerization catalysts may be reactivated using an activator, for example, a compound capable of alkylating the passivated catalyst such as, for example, an alkylaluminum compound. The reactivated catalysts are effective as olefin polymerization catalysts and are thus useful in polymerization processes for the production of polyolefins such as polypropylene. The invention thus may be understood as further directed to a process for the polymerization of $C_2$–$C_{14}$ olefins in the presence of a metallocene catalyst system wherein said catalyst is temporarily and reversibly passivated by contacting with oxygen or an oxygen- or nitrogen-containing compound, dispersed in the polymerization medium, and subsequently reactivated under process conditions Although the invention has been described and exemplified using specific metallocene catalysts comprising zirconium metallocenes and aluminoxane cocatalysts, the invented method may be applied to a variety of metallocene catalyst systems including those based on other Groups 4 and 5 metals and other cocatalysts such as boron compounds and the like. Further, oxygen-containing compounds and nitrogen-containing compounds other than those exemplified may also be found useful for these purposes. Those skilled in the art will readily understand that the examples set forth herein above are provided by way of illustration, and are not intended to limit the scope of the invention defined by the appended claims.

That which is claimed is:

1. A method for temporarily and reversibly passivating an active metallocene catalyst system supported on a suitable carrier comprising contacting the catalyst system with a passivator selected from oxygen, oxygen-containing compounds and nitrogen-containing compounds prior to transfer to a polymerization reactor, transferring the passivated metallocene catalyst to the polymerization reactor, and reactivating the passivated metallocene catalyst system in the reactor by contact with an alkylating agent.

2. The method of claim 1 wherein said metallocene catalyst system comprises a Group 4 or Group 5 metallocene and a cocatalyst.

3. The method of claim 1 wherein said metallocene catalyst system comprises a zirconium metallocene and an aluminoxane.

4. The method of claim 1 wherein said oxygen-containing compound is selected from metal alkoxides, ethers and cyclic ethers.

5. The method of claim 1 wherein said nitrogen-containing compound is selected from alkylamines, cycloalkylamines, and metal amides.

6. The method of claim 1 wherein said passivator is oxygen.

7. The method of claim 1 wherein the activity of said catalyst system after contacting with said passivator, as determined by catalyst yield in an olefin polymerization process, is no greater than 50% of the activity of the catalyst system before contacting with said passivator.

8. The method of claim 1 wherein an active supported metallocene catalyst system comprising a zirconium metallocene and an aluminoxane and is temporarily and reversibly passivated by contacting said catalyst system with an effective amount of a passivator selected from the group consisting of oxygen, oxygen-containing compounds and nitrogen-containing compounds, said supported catalyst system after contacting with said passivator having an activity as determined by catalyst yield in an olefin polymerization process, no greater than 50% of the activity of the catalyst system before contacting with said passivator.

9. The method of claim 1 wherein the alkylating agent is a metal alkyl.

10. The method of claim 9 wherein the akylating agent is an aluminum alkyl.

11. The method of claim 9 wherein the akylating agent is trialkylaluminum.

12. The method of claim 9 wherein the akylating agent is trimethylaluminum.

* * * * *